US012662074B2

(12) United States Patent
Bennie et al.

(10) Patent No.: US 12,662,074 B2
(45) Date of Patent: Jun. 23, 2026

(54) SYSTEMS AND METHODS TO REDUCE GLARE IN A VEHICLE INTERIOR PORTION

(71) Applicant: Ford Global Technologies, LLC, Dearborn, MI (US)

(72) Inventors: Clara Bennie, Sterling Heights, MI (US); Mahmoud Yousef Ghannam, Canton, MI (US); Brian Bennie, Sterling Heights, MI (US)

( * ) Notice: Subject to any disclaimer, the term of this patent is extended or adjusted under 35 U.S.C. 154(b) by 108 days.

(21) Appl. No.: 18/741,585

(22) Filed: Jun. 12, 2024

(65) Prior Publication Data

US 2025/0381927 A1      Dec. 18, 2025

(51) Int. Cl.
| | |
|---|---|
| *G07C 5/00* | (2006.01) |
| *B60N 2/02* | (2006.01) |
| *B60R 16/023* | (2006.01) |
| *B60R 16/037* | (2006.01) |
| *G07C 5/02* | (2006.01) |
| *G07C 5/04* | (2006.01) |
| *G07C 5/08* | (2006.01) |

(52) U.S. Cl.
CPC .......... B60R 16/037 (2013.01); B60N 2/0268 (2023.08); B60N 2/0278 (2023.08); B60R 16/0231 (2013.01); *B60N 2210/24* (2023.08)

(58) Field of Classification Search
CPC . B60R 16/037; B60R 16/0231; B60N 2/0278; B60N 2/0268; B60N 2210/24
See application file for complete search history.

(56) References Cited

U.S. PATENT DOCUMENTS

| | | | |
|---|---|---|---|
| 2008/0036580 A1* | 2/2008 | Breed | B60R 21/01532 340/438 |
| 2017/0106728 A1* | 4/2017 | Nania | B60J 3/0243 |
| 2018/0304727 A1* | 10/2018 | Choi | B60J 3/04 |
| 2021/0094394 A1* | 4/2021 | Costa | B60H 1/00771 |

(Continued)

FOREIGN PATENT DOCUMENTS

| | | |
|---|---|---|
| CN | 110316030 B | 10/2021 |
| CN | 113619513 A | 11/2021 |

(Continued)

OTHER PUBLICATIONS

Bosch, How Bosch Innovates the Sun Visor, https://www.bosch-mobility.com/en/company/current-news/how-bosch-innovates-the-sun-visor/, Jun. 3, 2023, pp. 1-6.

*Primary Examiner* — Kito R Robinson
*Assistant Examiner* — Anthony Gabriel Mora
(74) *Attorney, Agent, or Firm* — Frank Lollo; Eversheds Sutherland (US) LLP

(57)             ABSTRACT
A vehicle including a sensor unit and a processor is disclosed. The sensor unit may be configured to capture inputs associated with vehicle interior and exterior portions. The processor may be configured to determine a presence of a glare on a user face associated with a user or an object located in a vehicle interior portion based on the inputs captured by the sensor unit. The processor may further determine a source of glare based on the inputs, responsive to determining the presence of the glare. The processor may further identify a remedial action to reduce the glare based on the source of glare, and output a notification including an information associated with the remedial action.

18 Claims, 6 Drawing Sheets

(56)       References Cited

U.S. PATENT DOCUMENTS

| | | | | |
|---|---|---|---|---|
| 2022/0105786 A1* | 4/2022 | Larry | .................... | B60K 35/60 |
| 2022/0170321 A1* | 6/2022 | Casey | .................. | G01J 1/4204 |
| 2022/0375378 A1* | 11/2022 | Kunkel | .................. | G06F 3/147 |
| 2023/0045471 A1* | 2/2023 | Burkholz | ................ | B60N 2/12 |
| 2024/0308392 A1* | 9/2024 | Miyoshi | ............... | B60R 16/037 |

FOREIGN PATENT DOCUMENTS

| | | | |
|---|---|---|---|
| CN | 115534771 A | 12/2022 |
| KR | 19980049691 A | 9/1998 |

* cited by examiner

600

602 — Start

604 — Determine a presence of glare on a user face or an object

606 — Determine a source of glare

608 — Identify a remedial action

610 — Output a notification

612 — Stop

SYSTEMS AND METHODS TO REDUCE GLARE IN A VEHICLE INTERIOR PORTION

FIELD

The present disclosure relates to systems and methods to reduce glare on a user face or an object located in a vehicle interior portion.

BACKGROUND

Glare from sunlight or light reflection off a surface onto the driver's eyes may cause inconvenience to the driver while driving. The glare also causes inconvenience to the passengers sitting on the front passenger sitting area and/or the rear sitting areas. Furthermore, it is known that sunlight falling on objects (e.g., food items) or electronics placed in a vehicle interior portion may adversely affect the object or electronics' performance/state.

While a sun visor does prevent the glare from falling onto the driver's eyes to some extent, the sun visor is not effective in preventing the glare in all scenarios. Thus, a system and method is required to effectively prevent glare on a user face or an object located in a vehicle interior portion.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
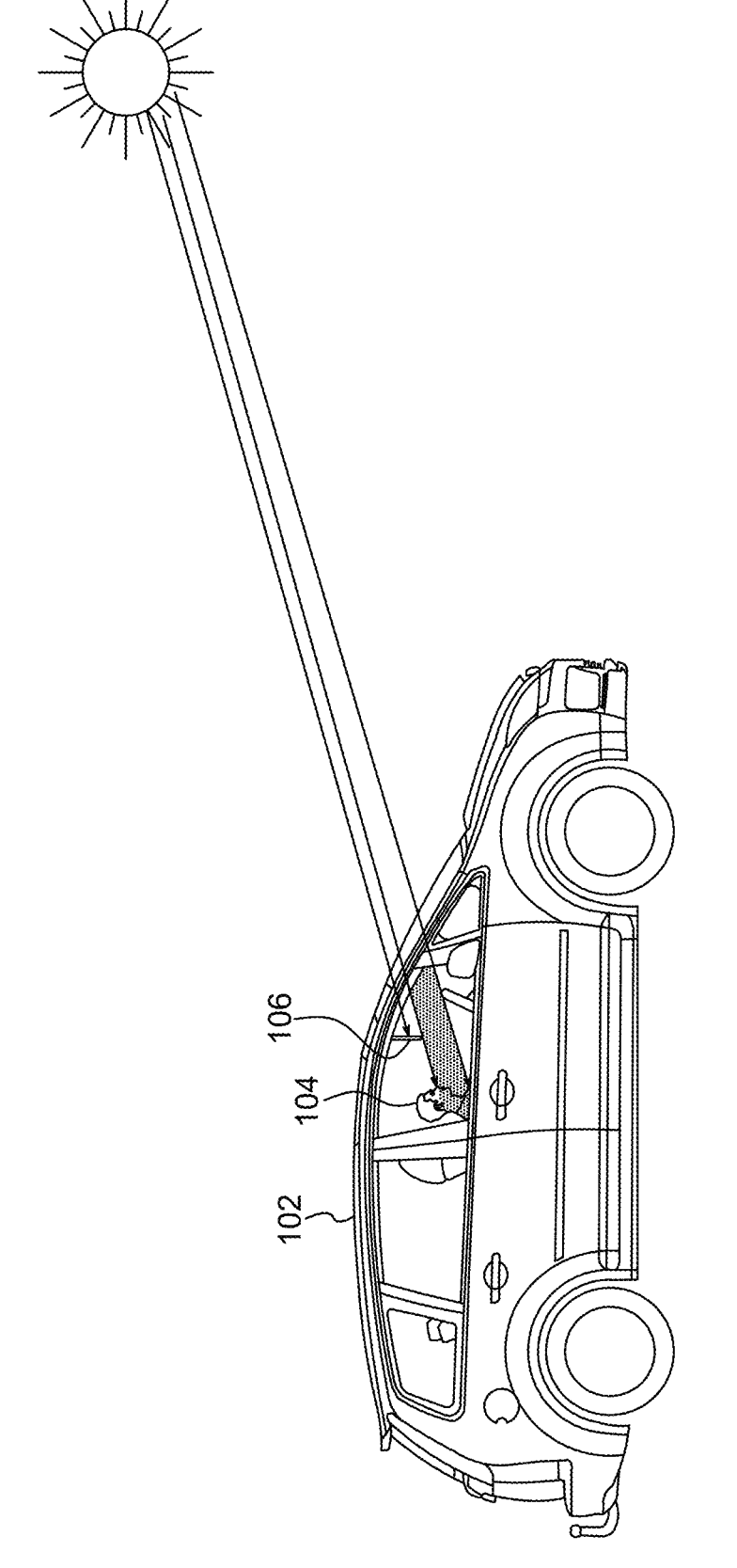
FIG. 1 depicts an environment in which techniques and structures for providing the systems and methods disclosed herein may be implemented.

The present disclosure describes a vehicle that may detect a presence of glare from sunlight on a user's face/eyes or an object located in a vehicle interior portion, and perform one or more remedial actions to reduce the glare. The vehicle may be configured to detect the presence of glare on the user's face or the object based on inputs obtained from a vehicle sensor unit, which may include, for example, vehicle interior and exterior cameras, an occupant sensing system, a global positioning system (GPS) receiver, and/or the like. Responsive to detecting the glare presence, the vehicle may determine a source of glare based on the inputs obtained from the sensor unit, and determine the remedial action(s) to reduce the glare based on the source of glare. The source of glare may be, for example, sunlight directly received from the sun, or light reflected off a reflective item located at the vehicle interior portion (e.g., on a vehicle dashboard) or another vehicle that may be traveling in front of the vehicle.

In an exemplary aspect, when the user experiencing the glare may be located at a driver/front passenger sitting area and the source of glare may be the sunlight directly received from the sun, the vehicle may either request or recommend the user to manually increase a driver/front passenger sitting area height to reduce the glare, or automatically increase the driver/front passenger sitting area height after receiving the user's consent. In another exemplary aspect, when the user or the object experiencing the glare may be located at a rear sitting area and the source of glare may be the sunlight directly received from the sun, the vehicle may automatically increase a rear sitting area height, rotate the rear sitting area, and/or move the rear sitting area forward or backward to reduce the glare. In some aspects, the freedom of movement for the rear sitting area may be more/greater than the freedom of movement for the driver/front passenger sitting area.

In yet another aspect, when the source of glare is reflection off a reflective item located at the vehicle interior portion, the vehicle may output a request for the user to re-position the reflective item to minimize sunlight reflection and reduce the glare. In further aspects, when the source of glare is reflection off another vehicle traveling in front of the vehicle, the vehicle may decrease the vehicle speed and/or change a vehicle lane (or request the user to decrease the vehicle speed and/or change the lane) to reduce the glare.

In additional aspects, the vehicle may be configured to "predict" or estimate a probability that the user may experience the glare at a future time, based on parameters such as a vehicle heading, a vehicle geolocation, a time of day, a time of year, user dimensions and position in the vehicle interior position, weather conditions, and/or the like. The vehicle may recommend the user to perform one or more preemptive actions to reduce or eliminate the glare at the future time, when the probability may be greater than a threshold value. Examples of the preemptive actions include, but are not limited to, cleaning the windshield, adjusting a sitting area height position, increasing a distance for forward object detection alert, proposing a lane driving aid activation, clearing one or more objects from the dashboard to minimize sunlight reflection, and/or the like.

In each of the aforementioned embodiments, the vehicle may detect the sun visor is not extended (that is, deployed), and may recommend to the user to extend down and/or adjust the sun visor. Further, the automatic height adjustment of the driver's sitting area may be limited, such as in the magnitude of the adjustment, for example, based on detected available headroom of the user.

The present disclosure discloses a vehicle that facilitates in reducing the glare that a user or an object located in the vehicle interior portion may be experiencing. The vehicle considerably enhances the user's convenience of driving or sitting in the vehicle by reducing the glare. Further, by reducing the glare on the object, the vehicle facilitates in preserving the object state and preventing the object from any deterioration. Further, most of the remedial actions are performed by the vehicle autonomously after obtaining user's confirmation, thereby minimizing user's intervention or involvement in reducing the glare. While in current vehicle designs there would be safety concerns with a driver moving their seat while the vehicle is in motion, it is anticipated that technology and the regulatory framework may evolve in the future to where such an activity is safe and permissible.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an environment 100 in which techniques and structures for providing the systems and methods disclosed herein may be implemented. The environment 100 may include a vehicle 102 that may take the form of any passenger or commercial vehicle such as a car, a work vehicle, a crossover vehicle, a truck, a van, a minivan, a taxi, a bus, etc. The vehicle 102 may be a manually driven vehicle or may be configured to operate in a partially/fully autonomous mode. Further, the vehicle 102 may include any powertrain such as a gasoline engine, one or more electrically-actuated motor(s), a hybrid system, etc.

A user 104 may be sitting inside the vehicle 102. In the exemplary aspect depicted in FIG. 1, the user 104 is shown as a driver sitting on a driver sitting area; however, the present disclosure is not limited to such an aspect. In alternative aspects, the user 104 may be sitting on a front passenger sitting area or any of the rear sitting areas. In further aspects (not shown), more than one user may be sitting/located in a vehicle interior portion.

Figure 4:
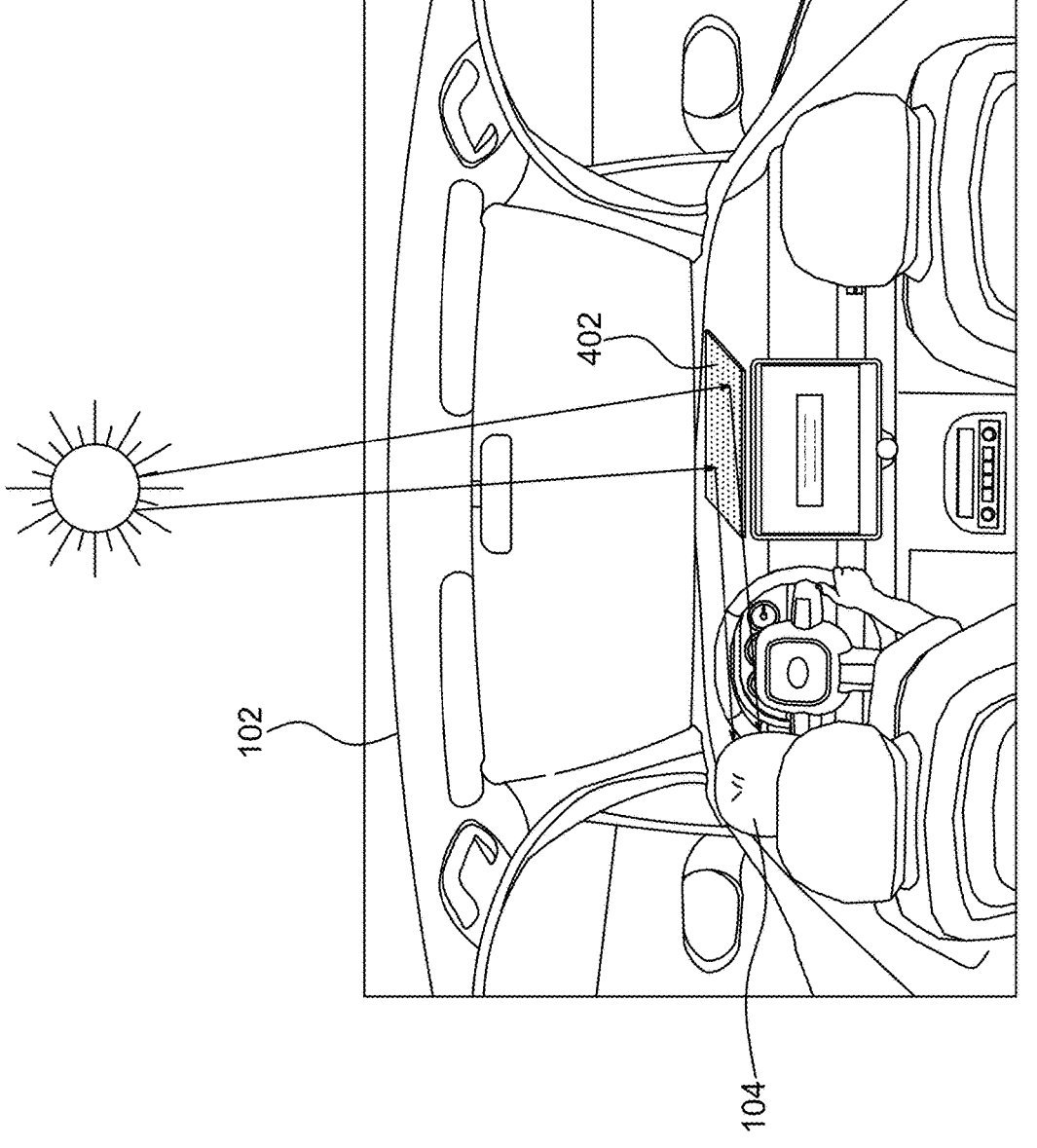
FIG. 4 depicts a view of a user sitting in a vehicle and sunlight being reflected off an object in accordance with the present disclosure.
Figure 5:
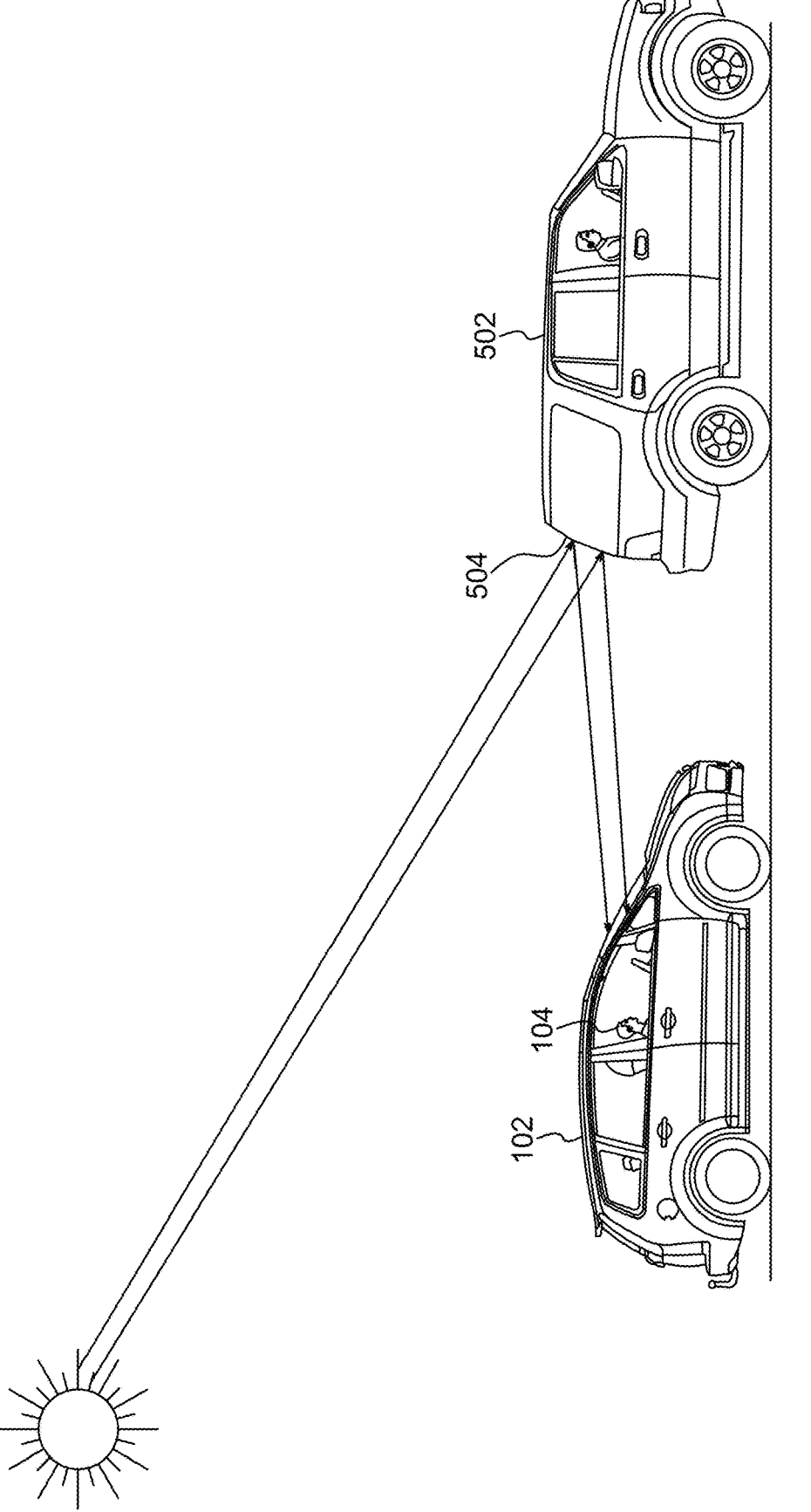
FIG. 5 depicts a view of sunlight being reflected off a vehicle in accordance with the present disclosure.

The vehicle 102 may include a sun visor 106 that may prevent sunlight from falling on the user's face when the user 104 may sitting on the driver sitting area or the front passenger sitting area, and the sun visor 106 is in an extended position (as shown in FIG. 1). It is known that, in some instances, depending on an angle of incidence of sunlight into the vehicle interior portion, glare from sunlight may still fall on the user's face/eyes even when the sun visor 106 is in the extended position. Further, the sun visor 106 may not be able to optimally prevent the glare on the user's face/eyes when the sunlight may be falling onto the user's face/eyes by getting reflected off a reflective item (e.g., a paper, a reflective sheet, etc.) placed in the vehicle interior portion (as shown in FIG. 4 and described later) or another vehicle that may be located/traveling in front of the vehicle 102 (as shown in FIG. 5 and described later).

The vehicle 102 may be configured to determine a presence of glare from sunlight on the user's face/eyes or an object (or a "first object", which may be a food item, an electronics item, and/or the like) that may be located in the vehicle interior portion, and perform remedial actions to reduce the glare on the user's face/eyes or the object. The vehicle 102 may determine the presence of glare from sunlight on the user's face/eyes or the object based on inputs obtained from a vehicle sensor unit (shown as vehicle sensory system 232 in FIG. 2). In some aspects, the vehicle sensor unit may include exterior and interior vehicle cameras (e.g., interior stereo cameras, thermal cameras, time of flight cameras, RGB cameras, etc.) that may capture images of vehicle's interior and exterior portions. In an exemplary aspect, the vehicle 102 may use the images captured by the vehicle sensor unit to determine user's behavior (e.g., if the user 104 may trying to hide the eyes/face with one hand, blinking eyes at a high frequency, etc.), an angle of incidence of sunlight into the vehicle interior portion, user's dimensions or position in the vehicle interior portion, and/or the like, which may assist the vehicle 102 to determine that the user 104 may be experiencing glare. In additional or alternative aspects, the vehicle sensor unit may include one or more sensors (e.g., GPS sensors, an occupant sensing system, etc.) that may determine a vehicle's heading, a position of sun relative to the vehicle 102, etc., which may assist the vehicle 102 to determine/confirm that the user 104 or the object located in the vehicle interior portion may be experiencing glare.

Responsive to determining the presence of glare on the user's face/eyes or the object, the vehicle 102 may determine a source of glare based on the inputs obtained from the sensor unit. Specifically, the vehicle 102 may determine whether the glare may be due to the sunlight directly received from the sun, or due to the sunlight being reflected off a reflective item (e.g., a "second object") located in the vehicle interior portion or another vehicle that may be traveling in front of the vehicle 102. Responsive to determining the source of glare, the vehicle 102 may identify and perform one or more actions to reduce the glare based on the determined source of glare, a user/object location in the vehicle 102, and whether the user 104 or the object located in the vehicle 102 is experiencing the glare. Examples of actions performed by the vehicle 102 are described below, which should not be construed as limiting.

In a first exemplary aspect, when the vehicle 102 determines that the user 104 sitting on the driving sitting area or the front passenger sitting area is experiencing glare (even when the sun visor 106 is in the extended position) and the source of glare is sunlight directly received from the sun, the vehicle 102 may determine a first remedial action to reduce the glare on the user's face/eyes. The first remedial action may be, for example, increasing a driving sitting area height or a front passenger sitting area height to an optimal height such that the glare on the user's face/eyes may be reduced. A person ordinarily skilled in the art may appreciate that if the driving sitting area height or the front passenger sitting area height is increased, the glare on the user's face/eyes may get further blocked (or blocked by a higher percentage) by the sun visor 106, thereby reducing the glare. In some aspects, the vehicle 102 may determine the optimal height associated with the driving sitting area height or the front passenger sitting area height based on user's dimensions (e.g., user height) and/or user's location in the vehicle interior portion.

Responsive to determining the first remedial action, the vehicle 102 may output a notification on a user device (shown as user device 202 in FIG. 2) or a vehicle Human-Machine Interface (HMI, shown as infotainment system 238 in FIG. 2), requesting the user 104 to either manually adjust the driving sitting area height or the front passenger sitting area height to the determined optimal height or allow the vehicle 102 to automatically adjust the sitting area height. The vehicle 102 may automatically adjust the driver sitting area height or the front passenger sitting area height to the determined optimal height when the user 104 confirms and allows the vehicle 102 to make automatic adjustment. In this manner, the vehicle 102 facilitates in reducing the glare on the user's face/eyes.

In a second exemplary aspect, when the vehicle 102 determines that the user 104 sitting on the rear sitting area is experiencing glare and the source of glare is sunlight directly received from the sun, the vehicle 102 may determine a second remedial action to reduce the glare on the user's face/eyes. The second remedial action may be, for example, increasing a rear sitting area height to an optimal height to reduce the glare, rotating the rear sitting area by an optimal angle, increasing or decreasing a distance between the rear sitting area and a sitting area in front of the rear sitting area (i.e., moving the rear sitting area towards the front or back), and/or the like. A person ordinarily skilled in the art may appreciate that the freedom of movement for the rear sitting area is greater than the freedom of movement for the driver sitting area/front passenger sitting area, and thus the second remedial action includes the additional steps of rotating and/or moving the rear sitting area front or back (which are not possible or advisable for the driver sitting area).

Responsive to determining the second remedial action, the vehicle 102 may output a notification on the user device or the HMI requesting the user 104 to either manually adjust the rear sitting area based on the determined height/rotation angle or forward/backward movement, or allow the vehicle 102 to automatically adjust the rear sitting area to reduce the glare. In this aspect as well, the vehicle 102 may automatically adjust the rear sitting area to reduce the glare when the user 104 confirms and allows the vehicle 102 to make automatic adjustment.

In a third exemplary aspect, when the vehicle 102 determines that the object (and not the user 104) located on the rear sitting area is experiencing glare and the source of glare is sunlight directly received from the sun, the vehicle 102 may determine a third remedial action to reduce the glare on the object. The third remedial action may be similar to the second remedial action; however, the movement of the rear sitting area may be greater or more pronounced when the object is experiencing the glare (and not the user 104). For example, in this case, the rear sitting area may be rotated by a greater angle (e.g., by 45 degrees or more), than the rotation angle that may be possible or advisable when the user 104 may be sitting on the rear sitting area. Further, in this case, in some aspects, the vehicle 102 may not be required to obtain a confirmation from the user 104 for moving/adjusting the rear sitting area, and may automatically adjust the rear suiting area when the vehicle 102 determines that sunlight may be falling on the object placed on the rear suiting area.

In a fourth exemplary aspect, when the vehicle 102 determines that the source of glare on the user 104 or the object is reflection off a reflective item located in a vehicle interior portion (e.g., a paper or a reflective sheet placed on a vehicle dashboard, as shown in FIG. 4 and described later), the vehicle 102 may determine a fourth remedial action to reduce the glare on the user's face/eyes or the object. The fourth remedial action may include moving the reflective item from its current location to any other location where the reflection is minimized/eliminated. In this case, responsive to determining the fourth remedial action, the vehicle 102 may output a notification on the user device/HMI, requesting the user 104 to move the reflective item from its current location to any other location in the vehicle interior portion.

In a fifth exemplary aspect, when the vehicle 102 determines that the source of glare on the user 104 or the object is reflection off a reflective item located in proximity to a vehicle exterior portion (e.g., a rear windshield of another vehicle traveling in front of the vehicle 102, as shown in FIG. 5 and described later), the vehicle 102 may determine a fifth remedial action to reduce the glare on the user's face/eyes or the object. The fifth remedial action may include decreasing the vehicle 102 speed to increase a distance between the vehicle 102 and the reflective item, and/or changing a vehicle lane. In this case, responsive to determining the fifth remedial action, the vehicle 102 may output a notification on the user device/HMI, requesting the user 104 to either manually decrease the vehicle 102 speed and/or change lane, or allow the vehicle 102 to automatically decrease its speed and/or change the lane. The vehicle 102 may automatically decrease its speed and/or change the lane, when the user 104 confirms and allows the vehicle 102 to decrease the speed and/or change the lane.

Further vehicle details are described below in conjunction with FIG. 2.

The vehicle 102 and/or the user 104 implement and/or perform operations, as described here in the present disclosure, in accordance with the owner manual and safety guidelines. In addition, any action taken by the user 104 based on the notifications/recommendations provided by the vehicle 102 should comply with all the rules specific to the location and operation of the vehicle 102 (e.g., Federal, state, country, city, etc.). The notifications/recommendations, as provided by the vehicle 102, should be treated as suggestions and only followed according to any rules specific to the location and operation of the vehicle 102.

Figure 2:
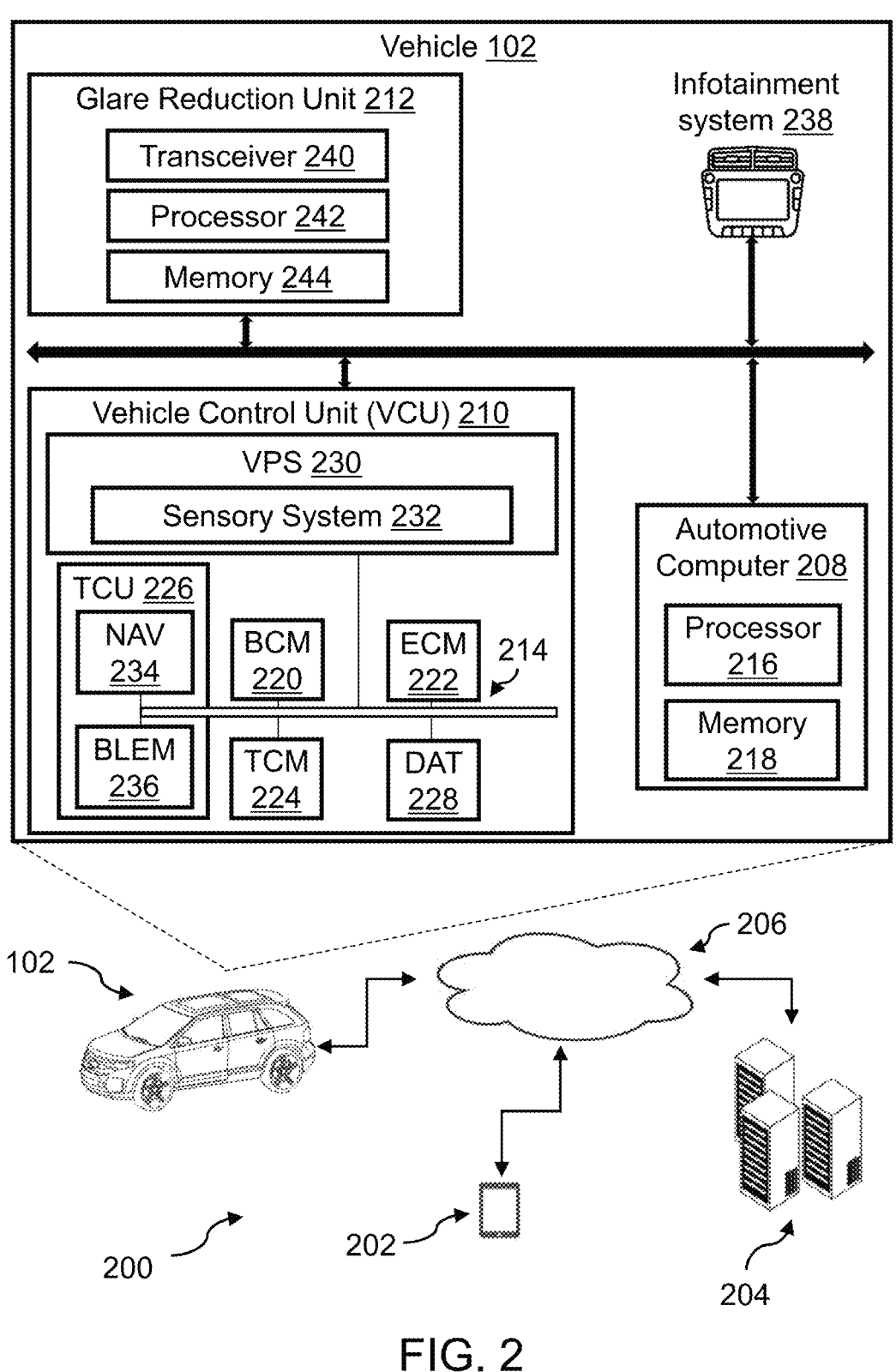
FIG. 2 depicts a block diagram of a system to prevent glare in accordance with the present disclosure.

FIG. 2 depicts a block diagram of a system 200 to prevent glare in accordance with the present disclosure. While describing FIG. 2, references will be made to FIGS. 3, 4 and 5.

The system 200 may include the vehicle 102, a user device 202 and one or more servers 204 (or a server 204) communicatively coupled with each other via one or more networks 206. The user device 202 may be associated with the user 104, and may be, for example, a mobile phone, a computer, a laptop, a smartwatch, a tablet, or any other device with communication capabilities. The server 204 may be part of a cloud-based computing infrastructure and may be associated with and/or include a Telematics Service Delivery Network (SDN) that provides digital data services to the vehicle 102 and other vehicles (not shown in FIG. 2) that may be part of a vehicle fleet. In further aspects, the server 204 may be configured to provide one or more image processing algorithms to the vehicle 102 that may enable the vehicle 102 to analyze images captured by the vehicle's interior and exterior cameras, and determine a presence of glare on the user's face/eyes and/or the object located in the vehicle interior portion, user's dimensions and location in the vehicle interior portion, the source of glare, and/or the like, based on the image analysis. The server 204 may transmit the image processing algorithms described above to the vehicle 102 at a predefined frequency, or when the vehicle 102 transmits a request to the server 204 to obtain the algorithms.

The network(s) 206 illustrates an example communication infrastructure in which the connected devices discussed in various embodiments of this disclosure may communicate. The network(s) 206 may be and/or include the Internet, a private network, public network or other configuration that operates using any one or more known communication protocols such as transmission control protocol/Internet protocol (TCP/IP), Bluetooth®, Bluetooth Low Energy (BLE), Wi-Fi based on the Institute of Electrical and Electronics Engineers (IEEE) standard 802.11, Ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The vehicle 102 may include a plurality of units including, but not limited to, an automotive computer 208, a Vehicle Control Unit (VCU) 210, and a glare reduction unit 212 (or unit 212). The VCU 210 may include a plurality of Electronic Control Units (ECUs) 214 in communication with the automotive computer 208.

In some aspects, the automotive computer 208 and/or the unit 212 may be installed anywhere in the vehicle 102, in accordance with the disclosure. Further, the automotive computer 208 may operate as a functional part of the unit 212. The automotive computer 208 may be or include an electronic vehicle controller, having one or more processor(s) 216 and a memory 218. Moreover, the unit 212 may be separate from the automotive computer 208 (as shown in FIG. 2) or may be integrated as part of the automotive computer 208.

The processor(s) 216 may be in communication with one or more memory devices in communication with the respective computing systems (e.g., the memory 218 and/or one or more external databases not shown in FIG. 2). The processor(s) 216 may utilize the memory 218 to store programs in code and/or to store data for performing aspects in accordance with the disclosure. The memory 218 may be a non-transitory computer-readable medium or memory storing a glare reduction program code. The memory 218 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

In accordance with some aspects, the VCU 210 may share a power bus with the automotive computer 208 and may be configured and/or programmed to coordinate the data between vehicle 102 systems, connected servers (e.g., the server(s) 204), and other vehicles (not shown in FIG. 2) operating as part of a vehicle fleet. The VCU 210 may include or communicate with any combination of the ECUs 214, such as a Body Control Module (BCM) 220, an Engine Control Module (ECM) 222, a Transmission Control Module (TCM) 224, a Telematics Control Unit (TCU) 226, a Driver Assistances Technologies (DAT) controller 228, etc. The VCU 210 may further include and/or communicate with a Vehicle Perception System (VPS) 230, having connectivity with and/or control of one or more vehicle sensory system(s) 232 (or a "sensor unit"). The vehicle sensory system 232 may include one or more vehicle sensors including, but not limited to, a radio detection and ranging (radar) sensor configured for detection and localization of objects inside and outside the vehicle 102 using radio waves, sitting area buckle sensors, sitting area sensors, a light detecting and ranging (lidar) sensor, door sensors, proximity sensors, ultrasonic sensors, temperature sensors, wheel sensors, ambient weather sensors, vehicle internal and external cameras, an occupant sensing system, one or more rain sensors, capacitive moisture sensors, etc.

In some aspects, the vehicle sensory system 232 may be configured to capture inputs (e.g., images) associated with the vehicle interior and exterior portions. The vehicle sensory system 232 may be further configured to determine a vehicle heading, weather conditions in an area where the vehicle 102 may be located, and/or the like.

In some aspects, the VCU 210 may control vehicle operational aspects and implement one or more instruction sets received from the user device 202, the server 204, from one or more instruction sets stored in the memory 218, including instructions operational as part of the unit 212.

The TCU 226 may be configured and/or programmed to provide vehicle connectivity to wireless computing systems onboard and off board the vehicle 102 and may include a Navigation (NAV) receiver 234 for receiving and processing a GPS signal, a BLE Module (BLEM) 236, a Wi-Fi transceiver, a UWB transceiver, and/or other wireless transceivers (not shown in FIG. 2) that may be configurable for wireless communication (including cellular communication) between the vehicle 102 and other systems (e.g., a key fob, not shown), computers, and modules. The TCU 226 may be in communication with the ECUs 214 by way of a bus. In some aspects, the NAV receiver 234 (which may be part of the vehicle sensor unit or separate from the sensor unit) may be configured to determine a real-time vehicle geolocation.

The ECUs 214 may control aspects of vehicle operation and communication using inputs from human drivers, inputs from an autonomous vehicle controller, the unit 212, and/or via wireless signal inputs received via the wireless connection(s) from other connected devices, such as the user device 202, the server(s) 204, among others.

The BCM 220 generally includes integration of sensors, vehicle performance indicators, and variable reactors associated with vehicle systems and may include processor-based power distribution circuitry that can control functions associated with the vehicle body such as lights, windows, security, camera(s), headlights, audio system(s), speakers, wipers, door locks and access control, driver/front passenger/rear sitting areas, and various comfort controls. The BCM 220 may also operate as a gateway for bus and network interfaces to interact with remote ECUs (not shown in FIG. 2).

The DAT controller 228 may provide Level-1 through Level-3 automated driving and driver assistance functionality that may include, for example, active parking assistance, vehicle backup assistance, and adaptive cruise control, among other features. The DAT controller 228 may also provide aspects of user and environmental inputs usable for user authentication.

In some aspects, the automotive computer 208 may connect with an infotainment system 238 (or a vehicle Human-Machine Interface (HMI)). The infotainment system 238 may include a touchscreen interface portion and may include voice recognition features, biometric identification capabilities that can identify users based on facial recognition, voice recognition, fingerprint identification, or other biological identification means. In other aspects, the infotainment system 238 may be further configured to receive user instructions/inputs via the touchscreen interface portion, and/or display notifications/recommendations, navigation maps, etc. on the touchscreen interface portion.

The computing system architecture of the automotive computer 208, the VCU 210, and/or the unit 212 may omit certain computing modules. It should be readily understood that the computing environment depicted in FIG. 2 is an example of a possible implementation according to the present disclosure, and thus, it should not be considered limiting or exclusive.

In accordance with some aspects, the unit 212 may be integrated with and/or executed as part of the ECUs 214. The unit 212, regardless of whether it is integrated with the automotive computer 208 or the ECUs 214, or whether it operates as an independent computing system in the vehicle 102, may include a transceiver 240, a processor 242, and a computer-readable memory 244, which may be communicatively coupled with each other.

The transceiver 240 may be configured to receive information/inputs from one or more external devices or systems, e.g., the user device 202, the server(s) 204, and/or the like via the network 206. For example, the transceiver 240 may receive the image processing algorithms described above from the server(s) 204 via the network 206. Further, the transceiver 240 may transmit notifications (e.g., alert/alarm signals) to the external devices or systems. In addition, the transceiver 240 may be configured to receive information/ inputs from vehicle 102 components such as the infotainment system 238, the vehicle sensory system 232, the TCU 226, and/or the like. Further, the transceiver 240 may transmit notifications (e.g., alert/alarm/command signals) to the vehicle 102 components such as the infotainment system 238, the VCU 210, etc.

The processor 242 and the memory 244 may be the same as or similar to the processor 216 and the memory 218, respectively. In some aspects, the processor 242 may utilize the memory 244 to store programs in code and/or to store data for performing aspects in accordance with the disclosure. The memory 244 may be a non-transitory computer-readable medium or memory storing the glare reduction program code. In some aspects, the memory 244 may be configured to store the image processing algorithms that the vehicle 102 obtains from the server(s) 204.

In operation, the processor 242 may obtain inputs from the vehicle sensory system 232 and the TCU 226, when the vehicle 102 may be traveling. The inputs may be, for example, images of the vehicle interior and exterior portions, a real-time vehicle geolocation, a vehicle heading, and/or the like. The processor 242 may analyze the obtained inputs, and may determine a presence of glare on the user's face/eyes or the object located in the vehicle interior portion based on the input analysis. In an exemplary aspect, the processor 242 may use the image processing algorithms obtained from the server 204 to analyze the images captured by the vehicle interior and/or exterior cameras, and determine the presence of glare on the user's face/eyes or the object located in the vehicle interior portion based on the image analysis. In further aspects, the processor 242 may determine a user location in the vehicle interior portion, user's dimensions, sun's location relative to the vehicle 102, an angle of incidence of sunlight into the vehicle interior portion, user's behavior, and/or the like based on the analysis of the obtained inputs, to determine the presence of glare on the user's face/eyes or the object located in the vehicle interior portion.

Responsive to determining the presence of glare on the user's face/eyes or the object located in the vehicle interior portion, the processor 242 may determine the source of glare based on the obtained inputs. As described above in conjunction with FIG. 1, the source of glare may be the sunlight received directly from the sun (as shown in FIG. 1), or light reflected off a reflective item 402 (e.g., a paper, a reflective sheet, etc., as shown in FIG. 4) placed in the vehicle interior portion (e.g., the dashboard) or another object or a vehicle 502 that may be located/traveling in front of the vehicle 102 (as shown in FIG. 5).

Responsive to determining the source of glare, the processor 242 may identify one or more remedial actions that may be performed to reduce the glare on the user's face or the object located in the vehicle interior portion, based on the source of glare. As described above in conjunction with FIG. 1, in addition to being based on the source of glare, the remedial actions may be based on whether the user 104 is located/sitting on the driver sitting area, the front passenger sitting area, or the rear sitting area, and/or whether the glare is experienced by the user 104 or the object located in the vehicle interior portion. Examples of the remedial actions are described below, which should not be construed as limiting.

In a first exemplary aspect, when the processor 242 determines that the user 104 sitting on the driving sitting area or the front passenger sitting area is experiencing glare and the source of glare is sunlight directly received from the sun based on the obtained inputs, the processor 242 may determine an optimal driver sitting area height or an optimal front passenger sitting area height that may reduce the glare on the user's face/eyes. In some aspects, to determine the optimal driver/front passenger sitting area height that may reduce the glare, the processor 242 may first determine the user's dimensions, the user position in the vehicle interior portion and the angle of incidence of sunlight into the vehicle interior portion based on the obtained inputs, and then use this information to determine the optimal driver/ front passenger sitting area height.

Responsive to determining the optimal driver/front passenger sitting area height as described above, the processor 242 may output a notification on the user device 202, the infotainment system 238 and/or via a vehicle speaker. The notification may include the information associated with the remedial action that should be performed to reduce the glare. In an exemplary aspect, the notification may include information associated with the determined optimal driver/front passenger sitting area height, a request to allow automatic adjustment of the driver/front passenger sitting area height, information on the source of glare, and/or one or more tutorial material for the user 104 illustrating how to adjust the driver/front passenger sitting area height. As an example, the notification may visually or audibly state, "Increase the sitting area height by one inch to reduce glare".

Responsive to viewing/hearing the notification described above, the user 104 may either manually adjust or increase the driver/front passenger sitting area height to the optimal height, or may input a confirmation for the vehicle 102 to automatically increase the driver/front passenger sitting area height to the optimal height. In the latter case, the user 104 may input the confirmation on the user device 202, the infotainment system 238 or via a voice command. The processor 242 may obtain the confirmation (via the transceiver 240) from the user 104, and then transmit a command signal to the BCM 220 to automatically move the driver/ front passenger sitting area to the optimal driver/front passenger sitting area height responsive to obtaining the confirmation.

Figure 3:
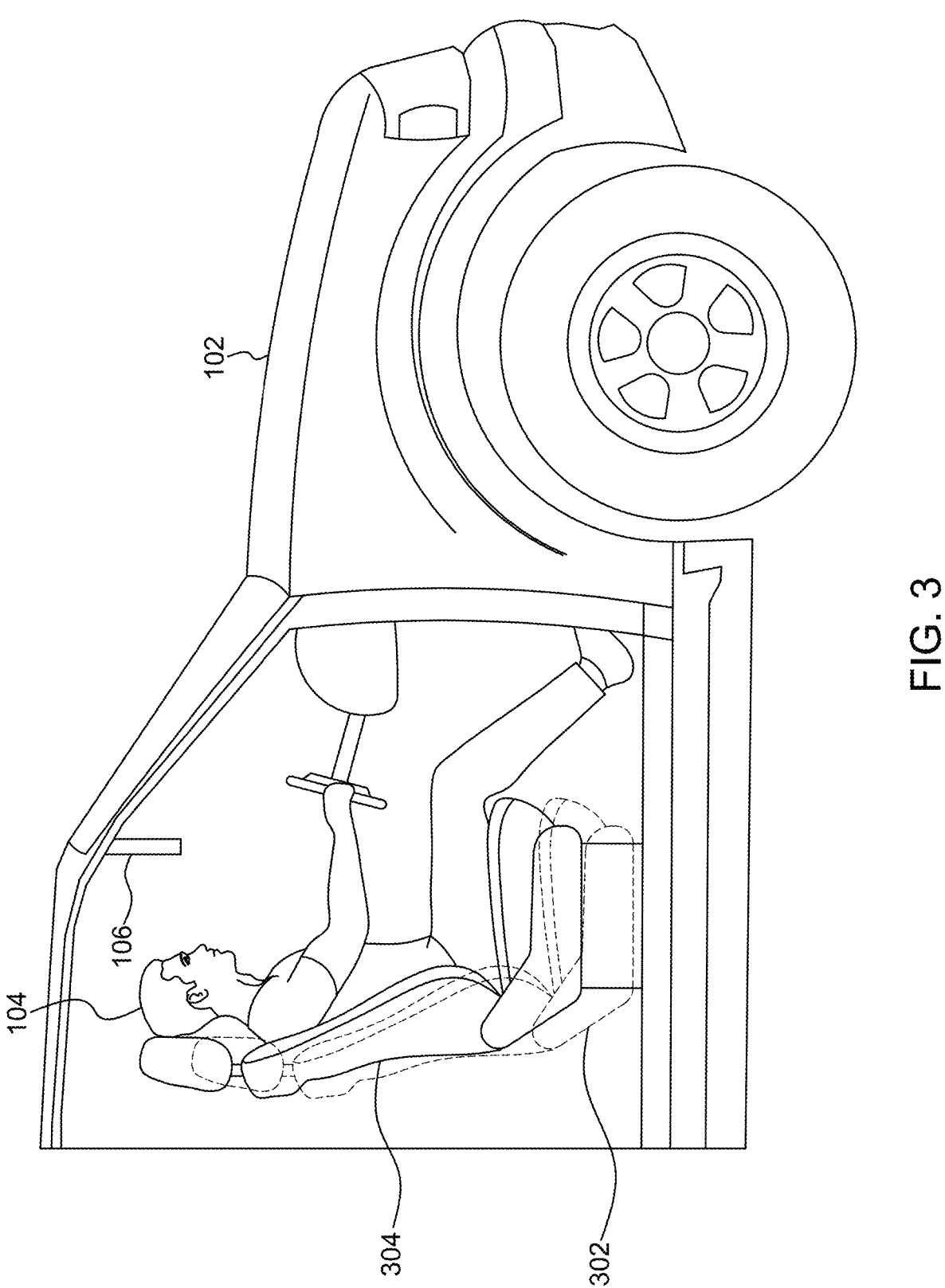
FIG. 3 depicts a view of a user sitting in a vehicle and a user sitting area height being adjusted in accordance with the present disclosure.

An example view of the driving sitting area height being increased is depicted in FIG. 3. A person ordinarily skilled in the art may appreciate that when an initial driving sitting area position/height 302 is increased to an optimal driving sitting area position/height 304 (as shown in FIG. 3), the sun visor 106 may be able to prevent the glare from sunlight on a larger portion (or length) of the user's face, thereby effectively and substantially reducing the glare on the user's face/eyes.

In a second exemplary aspect, when the processor 242 determines that the user 104 sitting on the rear sitting area is experiencing glare and the source of glare is sunlight directly received from the sun based on the obtained inputs, the processor 242 may determine an optimal rear sitting area rotation angle, an optimal rear sitting area height, and/or an optimal rear sitting area distance from a front sitting area to reduce the glare on the user's face/eyes. As described above in conjunction with FIG. 1, the freedom of movement for the rear sitting area may be considerably greater than the freedom of movement for the driver/front passenger sitting area, and hence the rear sitting area may be moved forward/ backward and/or rotated, which may not be possible/advisable for the driver/front passenger sitting area when the vehicle 102 may be traveling (e.g., when the user 104 may be driving the vehicle 102).

Responsive to determining the optimal rear sitting area rotation angle, the optimal rear sitting area height, and/or the optimal rear sitting area distance from the front sitting area as described above, the processor 242 may output a notification including this optimal rear sitting area position details and a request for the user 104 to allow automatic rear sitting area adjustment. The user 104 may view/hear the notification, and provide the confirmation to allow the processor 242 to automatically adjust the rear sitting area to reduce the glare. The processor 242 may obtain the confirmation from the user 104, and may then automatically adjust the rear sitting area to reduce the glare on the user's face/eyes based on the determined optimal rear sitting area rotation angle, the optimal rear sitting area height, and/or the optimal rear sitting area distance from the front sitting area, responsive to obtaining the confirmation.

In a third exemplary aspect, as described above in conjunction with FIG. 2, when the processor 242 determines that the object (and not the user 104) placed on the rear sitting area is experiencing glare and the source of glare is sunlight directly received from the sun based on the obtained inputs, the processor 242 may perform similar remedial actions as described above in the context of the second exemplary aspect; however, the movement of rear sitting area in this case may be greater or more pronounced. For example, in this case, the rear sitting area may be rotated by a greater angle (e.g., by 45 degrees or more), than the rotation angle that may be possible or advisable when the user 104 may be sitting on the rear sitting area. Further, in this case, in some aspects, the notification may not include the request for the user 104 to allow automatic rear sitting area adjustment, and the processor 242 may automatically adjust the rear suiting area to reduce the glare when the processor 242 determines that sunlight may be falling on the object placed on the rear suiting area.

In the first, second and third exemplary aspects described above, the processor 242 may output another notification on the user device 202, the infotainment system 238 and/or the vehicle speaker after automatically adjusting the driver/front passenger/rear sitting areas, informing the user 104 about the successful completion of the automatic sitting area adjustment to reduce the glare.

In a fourth exemplary aspect, when the processor 242 determines that the source of glare on the user 104 (irrespective of whether the user 104 is sitting on the driver/front passenger/rear sitting area) or the object is reflection off the reflective item 402 located in the vehicle interior portion (e.g., on the dashboard, as shown in FIG. 4) based on the obtained inputs, the processor 242 may output a notification requesting the user 104 to move the reflective item 402 away from its current location to any other location in the vehicle interior portion. Responsive to viewing/hearing the notification, the user 104 may move the reflective item 402 away from its current location, thereby minimizing or eliminating the sunlight reflection off the reflective item 402 and reducing the glare on the user's face/eye or the object.

In a fifth exemplary aspect, when the processor 242 determines that the source of glare on the user 104 or the object is reflection off a reflective item located in proximity to the vehicle exterior portion (e.g., a rear windshield 504 of the vehicle 502 traveling in front of the vehicle 102, as shown in FIG. 5), the processor 242 may output a notification requesting the user 104 to decrease the vehicle 102 speed to increase the distance between the vehicle 102 and the vehicle 502 or change a vehicle lane, or a request for the user 104 to allow the processor 242 to automatically decrease the vehicle 102 speed or change the lane. In the latter case, the user 104 may provide a confirmation responsive to viewing/hearing the notification. The processor 242 may obtain the confirmation, and may then automatically decrease the vehicle 102 speed or change the lane, responsive to obtaining the confirmation. In this manner, the processor 242 facilitates in reducing the glare that may be caused due to reflection off the vehicle 502 (or any other reflective item that may be located outside the vehicle 102).

Although the description above describes an aspect where the processor 242 determines and performs the remedial actions after determining that the user 104 and/or the object may be experiencing glare; however, the present disclosure is not limited to such an aspect. In additional aspects, the processor 242 may "predict" that the user 104 and/or the object may experience glare at a future time, and may perform or recommend the user to perform one or more pre-emptive actions to prevent the glare. In this case, the processor 242 may obtain additional inputs from the vehicle sensory system 232 (or the VCU 210), and may determine a probability of glare from sunlight at a future time based on the additional inputs. Examples of the additional inputs include, but are not limited to, a time of day, a time of year, weather conditions, the real-time vehicle geolocation, the vehicle heading, the user dimensions, the user position in the vehicle interior portion, and/or the like. Based on such inputs, the processor 242 may determine the direction of vehicle travel, presence or absence of sunlight, an expected angle of incidence of sunlight into the vehicle interior portion at a future time, and/or the like, which may facilitate the processor 242 to determine the probability that the user 104 may experience glare at a future time.

Responsive to determining the probability as described above, the processor 242 may compare the probability with a predefined threshold value (that may be pre-stored in the memory 244). The processor 242 may output a recommendation for the user 104 to perform one or more preemptive actions to reduce the glare at the future time, when the processor 242 determines that the probability may be greater than the predefined threshold value. The preemptive actions may be, for example, cleaning the vehicle windshield, adjusting the sitting area height position, increasing a distance for forward object detection alert, proposing a lane driving aid activation, clearing one or more objects from the vehicle dashboard to minimize sunlight reflection, and/or the like. Responsive to viewing/hearing the recommendation, the user 104 may perform the preventive action(s), thereby ensuring that the probability of experiencing glare at the future time is considerably reduced.

In some aspects, the remedial actions and/or the preemptive actions described above may further include additional actions such as activating the vehicle's power window shades, the vehicle's top portion shades, and/or the like, to reduce the glare on the user's face/eyes or the object.

Figure 6:
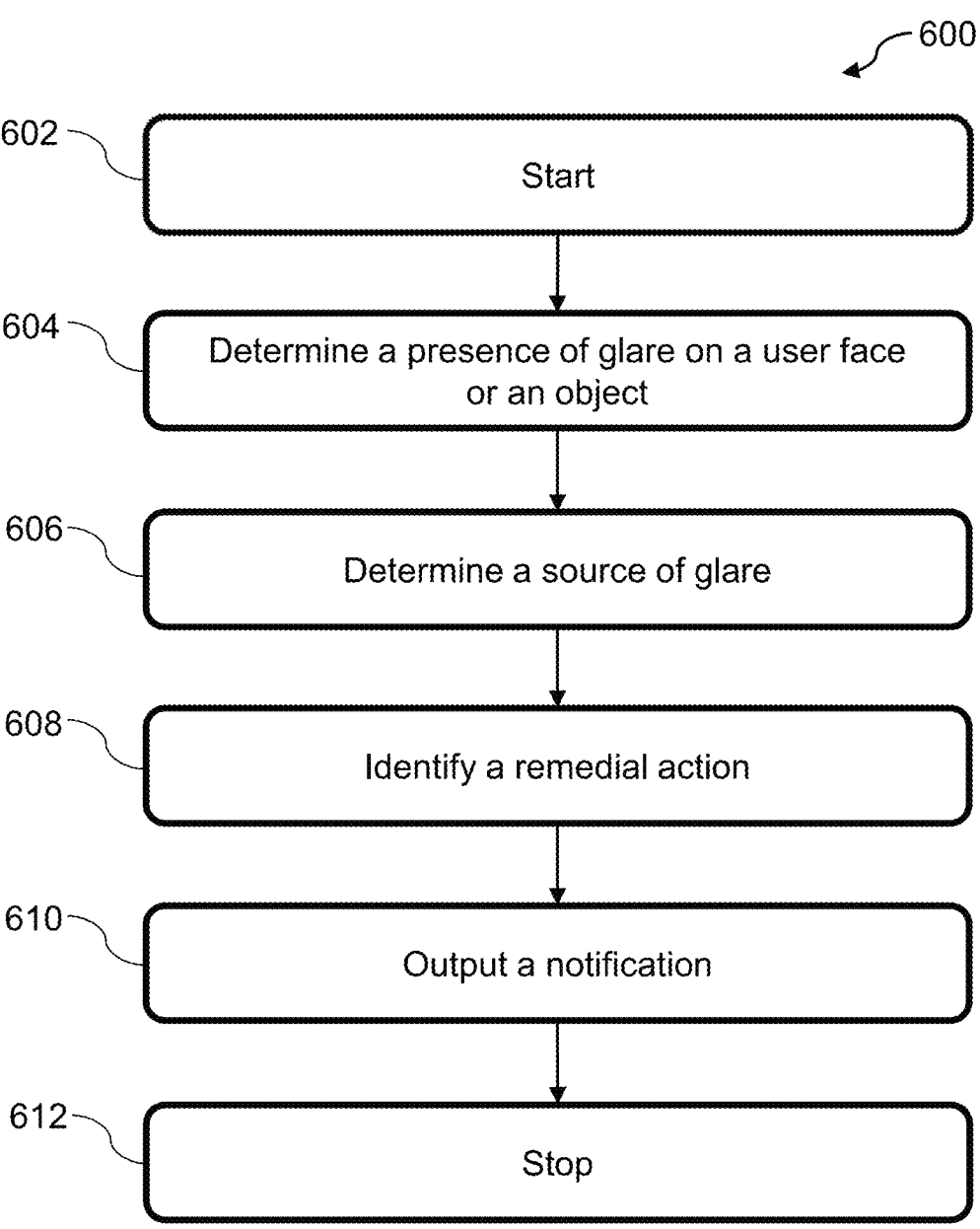
FIG. 6 depicts a flow diagram of a method to prevent glare in accordance with the present disclosure.

FIG. 6 depicts a flow diagram of a method 600 to prevent glare in accordance with the present disclosure. FIG. 6 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 600 starts at step 602. At step 604, the method 600 may include determining, by the processor 242, the presence of glare on the user's face/eyes or the object located in the vehicle interior portion based on the inputs captured by the vehicle sensory system 232 and/or TCU 226. At step 606, the method 600 may include determining, by the processor 242, the source of glare based on the inputs responsive to determining the presence of glare, as described above.

At step 608, the method 600 may include identifying, by the processor 242, one or more remedial actions to reduce the glare based on the source of glare. At step 610, the method 600 may include outputting, by the processor 242, a notification including the information associated with the identified remedial actions, as described above in conjunction with FIG. 2.

The method 600 may end at step 612.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:
a sensor unit configured to capture inputs associated with vehicle interior and exterior portions; and
a processor communicatively coupled with the sensor unit, wherein the processor is configured to:
determine a presence of a glare on at least one of a user face associated with a user or a first object located in a vehicle interior portion based on the inputs captured by the sensor unit;
determine a source of glare based on the inputs, responsive to determining the presence of the glare;
identify a remedial action to reduce the glare based on the source of glare;
output a notification comprising an information associated with the remedial action;
obtain a confirmation from the user responsive to outputting the notification; and
automatically move a driver sitting area to an optimal driver sitting area height or a front passenger sitting area to an optimal front passenger sitting area height, responsive to obtaining the confirmation.

2. The vehicle of claim 1, wherein the sensor unit comprises at least one of an interior camera, an exterior camera, an occupant sensing system, or a Global Positioning System (GPS) receiver.

3. The vehicle of claim 1, wherein the processor is further configured to:
determine that the user is located on the driver sitting area or the front passenger sitting area based on the inputs;
determine that the source of glare is sunlight directly received from sun based on the inputs; and determine the optimal driver sitting area height or the optimal front passenger sitting area height to reduce the glare on the user face responsive to determining that the user is located on the driver sitting area or the front passenger sitting area, and the source of glare is sunlight directly received from sun, wherein the information associated with the remedial action comprises the optimal driver sitting area height or the optimal front passenger sitting area height.

4. The vehicle of claim 3, wherein the processor is further configured to:

determine at least one of user dimensions or a user position in the vehicle interior portion, or an angle of incidence of sunlight based on the inputs; and determine the optimal driver sitting area height or the optimal front passenger sitting area height based on at least one of the user dimensions, the user position or the angle of incidence.

5. The vehicle of claim 1, wherein the processor is further configured to:

determine that the user or the first object is located on a rear sitting area based on the inputs;

determine that the source of glare is sunlight directly received from sun based on the inputs; and determine at least one of an optimal rear sitting area rotation angle, an optimal rear sitting area height, or an optimal rear sitting area distance from a front sitting area to reduce the glare on the user face or the first object responsive to determining that the user or the first object is located on the rear sitting area, and the source of glare is sunlight directly received from sun, wherein the information associated with the remedial action comprises at least one of the optimal rear sitting area rotation angle, the optimal rear sitting area height, or the optimal rear sitting area distance from the front sitting area.

6. The vehicle of claim 5, wherein the processor is further configured to:

obtain a confirmation from the user responsive to outputting the notification; and automatically move the rear sitting area based on at least one of the optimal rear sitting area rotation angle, the optimal rear sitting area height, or the optimal rear sitting area distance from the front sitting area, responsive to obtaining the confirmation.

7. The vehicle of claim 1, wherein the processor is further configured to determine that the source of glare is reflection off a second object located in a vehicle interior portion, wherein the information associated with the remedial action comprises instructions to move the second object away from a second object current location in the vehicle interior portion to reduce the glare.

8. The vehicle of claim 1, wherein the processor is further configured to determine that the source of glare is reflection off a second object located in proximity to a vehicle exterior portion, wherein the information associated with the remedial action comprises a request for the user to decrease a vehicle speed or change a vehicle lane to reduce the glare.

9. The vehicle of claim 8, wherein the processor is further configured to:

obtain a confirmation from the user responsive to outputting the notification; and automatically decrease the vehicle speed or change the vehicle lane, responsive to obtaining the confirmation.

10. The vehicle of claim 8, wherein the second object is another vehicle traveling in proximity to a vehicle front portion.

11. The vehicle of claim 1, wherein the processor outputs the notification via a vehicle Human-Machine Interface (HMI), a user device or a vehicle speaker.

12. The vehicle of claim 1, wherein the processor is further configured to:

obtain additional inputs associated with at least one of a time of day, a time of year, weather conditions, a real-time vehicle geolocation, a vehicle heading, or user dimensions and a user position in the vehicle interior portion;

determine a probability of glare from sunlight at a future time based on the additional inputs;

determine that the probability is greater than a threshold value; and output a recommendation for the user to perform one or more preemptive actions to reduce the glare at the future time.

13. The vehicle of claim 12, wherein the one or more preemptive actions comprise at least one of cleaning a windshield, adjusting a sitting area height position, increasing a distance for forward object detection alert, proposing a lane driving aid activation, or clearing one or more objects from a dashboard to minimize sunlight reflection.

14. A method to reduce glare, the method comprising:

determining, by a processor, a presence of a glare on at least one of a user face associated with a user or a first object located in a vehicle interior portion based on inputs captured by a sensor unit, wherein the sensor unit is configured to capture the inputs associated with vehicle interior and exterior portions;

determining, by the processor, a source of glare based on the inputs, responsive to determining the presence of the glare;

identifying, by the processor, a remedial action to reduce the glare based on the source of glare;

outputting, by the processor, a notification comprising an information associated with the remedial action;

obtaining a confirmation from the user responsive to outputting the notification; and automatically moving a driver sitting area to an optimal driver sitting area height or a front passenger sitting area to an optimal front passenger sitting area height, responsive to obtaining the confirmation.

15. The method of claim 14 further comprising:

determining that the user is located on the driver sitting area or the front passenger sitting area based on the inputs;

determining that the source of glare is sunlight directly received from sun based on the inputs; and determining the optimal driver sitting area height or the optimal front passenger sitting area height to reduce the glare on the user face responsive to determining that the user is located on the driver sitting area or the front passenger sitting area, and the source of glare is sunlight directly received from sun, wherein the information associated with the remedial action comprises the optimal driver sitting area height or the optimal front passenger sitting area height.

16. The method of claim 14 further comprising determining that the source of glare is reflection off a second object located in a vehicle interior portion, wherein the information associated with the remedial action comprises instructions to move the second object away from a second object current location in the vehicle interior portion to reduce the glare.

17. The method of claim 14 further comprising determining that the source of glare is reflection off a second object located in proximity to a vehicle exterior portion, wherein the information associated with the remedial action comprises a request for the user to decrease a vehicle speed or change a vehicle lane to reduce the glare.

18. A non-transitory computer-readable storage medium having instructions stored thereupon which, when executed by a processor, cause the processor to:

determine a presence of a glare on at least one of a user face associated with a user or an object located in a vehicle interior portion based on inputs captured by a sensor unit, wherein the sensor unit is configured to capture the inputs associated with vehicle interior and exterior portions;

determine a source of glare based on the inputs, responsive to determining the presence of the glare;

identify a remedial action to reduce the glare based on the source of glare;

output a notification comprising an information associated with the remedial action;

obtain a confirmation from the user responsive to outputting the notification; and automatically move a driver sitting area to an optimal driver sitting area height or a front passenger sitting area to an optimal front passenger sitting area height, responsive to obtaining the confirmation.

* * * * *